United States Patent Office 3,764,307
Patented Oct. 9, 1973

3,764,307
Ni-Au BASE BRAZING ALLOY
Raymond P. Barb, Saugus, and William Sutar, Boston, Mass., assignors to General Electric Company
No Drawing. Filed Aug. 4, 1972, Ser. No. 278,005
Int. Cl. C22c 19/00
U.S. Cl. 75—170     3 Claims

ABSTRACT OF THE DISCLOSURE

A nickel-gold base brazing alloy with relatively low gold content derives its properties from a balance of Au, Si and B in a Ni base. It has a liquidus of less than about 1900° F. for use in joining members intended to operate in the range of up to about 1400° F.

This invention relates to nickel base brazing alloys and, more particularly, to a Ni-Au base brazing alloy for use in joining members intended to operate up to about 1400° F.

Although gold is an expensive element to include in a brazing alloy, it has been found desirable to include such an element in a brazing alloy for joining sheet superalloys for operation up to about 1400° F. One commonly used gold-nickel brazing alloy consists nominally, by weight, of 82% gold and 18% nickel. Such an alloy exhibits a desirable combination of strength and ductility at the desired operating temperature. However, as might be expected from the high gold content, such an alloy adds significant cost to the article being joined for example, sheet metal components for aircraft gas turbine engines.

SUMMARY OF THE INVENTION

It is a principal object of the present invention to provide a nickel base brazing alloy having the same or better characteristics as the known 82% gold-18% nickel alloy but at a significantly lower cost.

Another object is to provide a nickel base brazing alloy which can be brazed at a temperature less than about 1900° F. for the manufacture of superalloy sheet metal components for operation in the range of up to about 1400° F.

These and other objects and advantages will be more clearly understood from the following detailed description and examples which are intended to be typical of rather than limiting on the scope of the present invention.

The Ni-Au base brazing alloy of the present invention, in one form, consists essentially of, by weight, 35–45% Au, 1–3% Si, 0.5–2% B with the balance nickel and incidental impurities.

DESCRIPTION OF THE PREFERRED EMBODIMENTS

During the evaluation of the brazing alloy of the present invention, a number of brazing alloy compositions were studied. One of these was the above mentioned 82% Au-18% Ni alloy which brazed in the range of about 1800–1825° F. Another brazing alloy evaluated and sometimes identified by the specification AMS 4779 has a brazing temperature in the range of about 1975–2000° F. and a nominal composition of, by weight, 3.5% Si, 1.8% B with the balance essentially Ni and incidental impurities. However, the brazing temperature for such alloy is too high for use with sheet alloys intended to operate up to about 1400° F Typical of such sheet alloys are those used in the evaluation of the present invention in the thickness range of about 0.03–0.08". However, it should be understood that the brazing alloy of the present invention can be used to join members of any thickness and in various forms such as sheet, forgings, etc. One sheet alloy used was a nickel base alloy consisting nominally of, by weight, 0.05% C., 19% Cr, 18.5% Fe, 3.1% Mo, 5.2% Cb plus Ta, 1% Ti, 0.5% Al with the balance essentially nickel and incidental impurities. Another sheet alloy used was an iron base alloy consisting nominally, by weight, of 16.5% Cr, 4% Ni, 4% Cu, 0.3% Cb plus Ta with the balance essentially Fe and incidental impurities.

The following Table I includes the composition of some brazing alloys evaluated in the brazing of the above identified sheet alloys.

TABLE I.—BRAZING ALLOY COMPOSITIONS

| Alloy | Weight percent balance Ni and incidental impurities | | |
|---|---|---|---|
| | Au | Si | B |
| 1 | 82 | | |
| 2 | 41 | 1.7 | 1.0 |
| 3 | 40 | 1.8 | 1.1 |
| 4 | 41 | 1.9 | 1.1 |
| 5 | 29 | 2.3 | 1.2 |
| 6 | 21 | 2.6 | 1.4 |

Of the alloys identified in Table I, alloys 2, 3 and 4 fall within the broad range of the alloy of the present invention of 35–45% Au, 1–3% Si, 0.5–2% B with the balance essentially nickel and incidental impurities, and within its preferred range of 40–42% Au, 1.5–2% Si, 0.5–1.5% B with the balance essentially nickel and incidental impurities. In preliminary studies in which brazing alloy melting and flow characteristics were determined in vacuum at 1825° F. for 15 minutes, alloy 6 in Table I was found to have too high a melting point and poor flow characteristics. Alloy 5 had only fair flow characteristics. Therefore, alloy 1, along with alloys 2, 3 and 4 were selected for further comparison.

Specimens of the above identified sheet alloys were prepared with 2T overlap joints in the range of 0.06–0.16" and a joint overlap area of 0.03–0.09 square inches. The thicknesses of the nickel base alloy sheets were 0.032" and 0.080" and the thickness of the iron base alloy sheet was 0.045".

Overlap shear tensile tests showed the tested alloys approximately equivalent at 1200° F. with alloy 1 somewhat better in indicated shear strength and ductility at room temperature. However, the following Table II shows the advantages of alloys 2, 3 and 4 within the scope of the present invention, in rupture shear at 1200° F.

TABLE II
[Average 1,200° F. overlap shear-rupture, braze temp., 1,850° F.]

| Braze alloy | Sheet alloy base | Nom. joint overlap (in.) (2T) | Joint stress (k.s.i.) | Life (hrs.) |
|---|---|---|---|---|
| 1 | Ni | 0.06 | 5 | 32 |
| 2 | Ni | 0.06 | 5 | 52 |
| 1 | Ni | 0.06 | 6 | 4 |
| 2 | Ni | 0.06 | 6 | 65 |
| 1 | Ni | 0.06 | 8 | 1 |
| 2 | Ni | 0.06 | 8 | 10 |
| 1 | Fe | 0.06 | 6 | 37 |
| 2 | Fe | 0.06 | 6 | [1] 188 |
| 3 | Ni | 0.16 | 5 | [1] 207 |
| 3 | Ni | 0.16 | 7 | 67 |
| 3 | Ni | 0.16 | 8 | 73 |
| 4 | Ni | 0.16 | 6 | [1] 233 |
| 4 | Ni | 0.16 | 7 | 88 |
| 4 | Ni | 0.16 | 8 | 20 |

[1] Run out.

In the above identified table and elsewhere in this description, the term "k.s.i." means "thousands of pounds per square inch." The thickness of the sheet used with alloy 2 was 0.032" and that used with alloys 3 and 4 was 0.080".

Additional tests were conducted to determine high cycle fatigue strength at room temperature. The advantage of alloys 2 and 3, within the scope of the present invention, used in joining 0.03" and 0.08" thick panels of the above identified nickel base alloy are shown in the following Table III.

TABLE III

[High Cycle Fatigue in Axial-Axial Mode]

| Alloy | Joint max. stress A=0.95 (k.s.i.) | Temp. (° F.) | Joint overlap (nom. in.) (2T) | Cycles (×10³) |
|---|---|---|---|---|
| 1 | 20 | Room | 0.06 | 94 |
| 2 | 20 | Room | 0.06 | 68 |
| 1 | 15 | Room | 0.06 | 320 |
| 2 | 15 | Room | 0.06 | 911 |
| 1 | 10 | Room | 0.06 | 2,263 |
| 2 | 10 | Room | 0.06 | 8,456 |
| 1 | 7 | 1,100 | 0.16 | 3,834 |
| 3 | 7 | 1,100 | 0.16 | ¹ 10,025 |
| 1 | 8.5 | 1,100 | 0.16 | 361 |
| 3 | 8.5 | 1,100 | 0.16 | ¹ 24,933 |

¹ Run out.

Because the liquidus temperature of the alloy of the present invention is less than 1900° F. and, in its preferred form at about 1830° F., the brazing of sheet metal specimens used in obtaining the above identified data were brazed in the range of about 1835–1885° F., for example about 1850° F. for ten minutes. However, its solidus temperature is about 1735° F., in the preferred form. Therefore, another advantage of the alloy of the present invention over the 82% Au–18% Ni alloy is its wide gap brazing ability based on the wide difference between its liquidus and solidus temperatures. Fit-up of many sheet metal components produces gaps of about 0.01" or more. The alloy of the present invention has been found to be capable of bridging such fit-up gaps.

To demonstrate the ductility and formability of the alloy of the present invention, a "T" joint was prepared. The vertical leg of the joint was gripped approximately 1/16" above the fillet and a 90° twist was applied without failure of the alloy of the present invention as well as of alloy 1.

Thus, the alloy of the present invention provides a Ni-Au base brazing alloy improved in respect to certain mechanical properties and significantly lower in cost than known brazing alloys for application in the range of up to about 1400° F.

What is claimed is:

1. A nickel base brazing alloy having a liquidus of less than about 1900° F. and consisting essentially of, by weight, 35–45% Au, 1–3% Si, 0.5–2% B with the balance Ni and incidental impurities.

2. The alloy of claim 1 in which the Au is 40–42%, the Si is 1.5–2%, and the B is 0.5–1.5%.

3. The alloy of claim 2 consisting nominally, by weight, of about 41% Au, about 1.7% Si, about 1% B with the balance Ni and incidental impurities.

References Cited

UNITED STATES PATENTS

| 2,944,891 | 7/1960 | Cape | 75—170 |
| 3,067,029 | 12/1962 | Gyorgy et al. | 75—170 |

RICHARD O. DEAN, Primary Examiner